US008868128B2

(12) United States Patent
Song

(10) Patent No.: US 8,868,128 B2
(45) Date of Patent: Oct. 21, 2014

(54) IMAGE DISPLAY SYSTEMS AND METHODS OF PROCESSING IMAGE DATA

(75) Inventor: Yong-Bae Song, Seoul (KR)

(73) Assignee: Samsung Electronics Co., Ltd. (KR)

( * ) Notice: Subject to any disclaimer, the term of this patent is extended or adjusted under 35 U.S.C. 154(b) by 307 days.

(21) Appl. No.: 13/414,938

(22) Filed: Mar. 8, 2012

(65) Prior Publication Data

US 2012/0236015 A1 Sep. 20, 2012

(30) Foreign Application Priority Data

Mar. 15, 2011 (KR) ........................ 10-2011-0022769

(51) Int. Cl.

*H04M 1/00* (2006.01)
*H04W 8/28* (2009.01)
*G09G 5/00* (2006.01)
*G09G 5/393* (2006.01)
*G09G 5/399* (2006.01)

(52) U.S. Cl.

CPC ................ *G09G 5/001* (2013.01); *G09G 5/393* (2013.01); *G09G 5/399* (2013.01)
USPC ..................... 455/551; 455/550.1; 455/556.1; 455/566

(58) Field of Classification Search

CPC .. H04M 1/72586; G06F 13/1668; G09G 5/39
USPC .............. 455/566, 514, 515, 434, 420, 67.11, 455/528, 550.1, 551, 552.1, 557, 556.1, 455/556.2, 185.1, 186.1, 90.1, 95; 345/531, 345/545; 713/401, 501
See application file for complete search history.

(56) References Cited

U.S. PATENT DOCUMENTS

| | | | | |
|---|---|---|---|---|
| 6,122,716 | A * | 9/2000 | Combs | 711/163 |
| 2008/0168295 | A1* | 7/2008 | Satoh et al. | 713/400 |

FOREIGN PATENT DOCUMENTS

| | | |
|---|---|---|
| JP | 2006-11645 | 1/2006 |
| JP | 2006-323726 | 11/2006 |
| KR | 10-2004-0032384 | 4/2004 |

* cited by examiner

*Primary Examiner* — John J Lee
(74) *Attorney, Agent, or Firm* — Myers Bigel Sibley & Sajovec, PA

(57) ABSTRACT

Image display systems include a first memory, a memory controller and a device driver. The controller is configured to generate an interrupt signal in response to a command to write first image data into a first range of addresses within the first memory, which at least partially overlaps with a reference range of addresses. The device driver is configured to read the first image data from the first memory in response to the interrupt signal.

16 Claims, 12 Drawing Sheets

240b

IMAGE DISPLAY SYSTEMS AND METHODS OF PROCESSING IMAGE DATA

REFERENCE TO PRIORITY APPLICATION

This application claims the benefit of Korean Patent Application No. 10-2011-0022769, filed Mar. 15, 2011, the disclosure of which is hereby incorporated herein by reference.

FIELD

The present inventive concept relates to integrated circuit devices and, more particularly, to image display devices and methods of operating same.

BACKGROUND

Image display systems typically process image data from applications, store the processed image data in a frame buffer and display image data in a display panel by reading the image data from the frame buffer. However, more efficient processing methods are required for displaying updated image data in display panels.

SUMMARY

Image display systems according to embodiments of the inventive concept include a first memory (e.g., surface memory), a memory controller and a device driver. The memory controller is configured to generate an interrupt signal in response to a command to write first image data into a first range of addresses within the first memory, which at least partially overlaps with a reference range of addresses. The device driver is configured to read the first image data from the first memory in response to the interrupt signal. The memory controller includes an address comparison circuit, which is configured to determine whether the first range of addresses at least partially overlaps with the reference range of addresses. The memory controller further comprises a register configured to store at least a starting address associated with the reference range of addresses. A display module is also provided, which is configured to receive the first image data from the driver. This display module includes a frame buffer, which is configured to store the first image data received from the driver.

According to additional embodiments of the inventive concept, the memory controller is configured to write second image data into a second range of addresses within the first memory, but without generation of the interrupt signal when the second range of addresses is outside the reference range of addresses. An arbitration circuit may also be provided, which is configured to provide the memory controller with a first packet of data. This first packet of data may include the write command, the first image data and at least a starting address associated with the first range of addresses.

Additional embodiments of the inventive concept include methods of operating an image display system. These methods may include comparing a first range of memory addresses associated with a first packet of image data against a reference range of addresses to detect at least a partial overlap therebetween. This comparison operation is performed concurrently with writing first image data contained within the first packet into a first memory device. An interrupt signal is also generated in response to detecting the at least a partial overlap between the first range of memory addresses and the reference range of addresses. The first image data is also transferred from the first memory device into a frame buffer within a display module, in response to the interrupt signal. In some of these embodiments of the inventive concept, the transferring operation include reading the first image data from the first memory device into a device driver configured to receive the interrupt signal and then writing the first image data from the device driver into the frame buffer. The comparing operation may also include evaluating a header of the first packet to detect presence of a write command therein.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
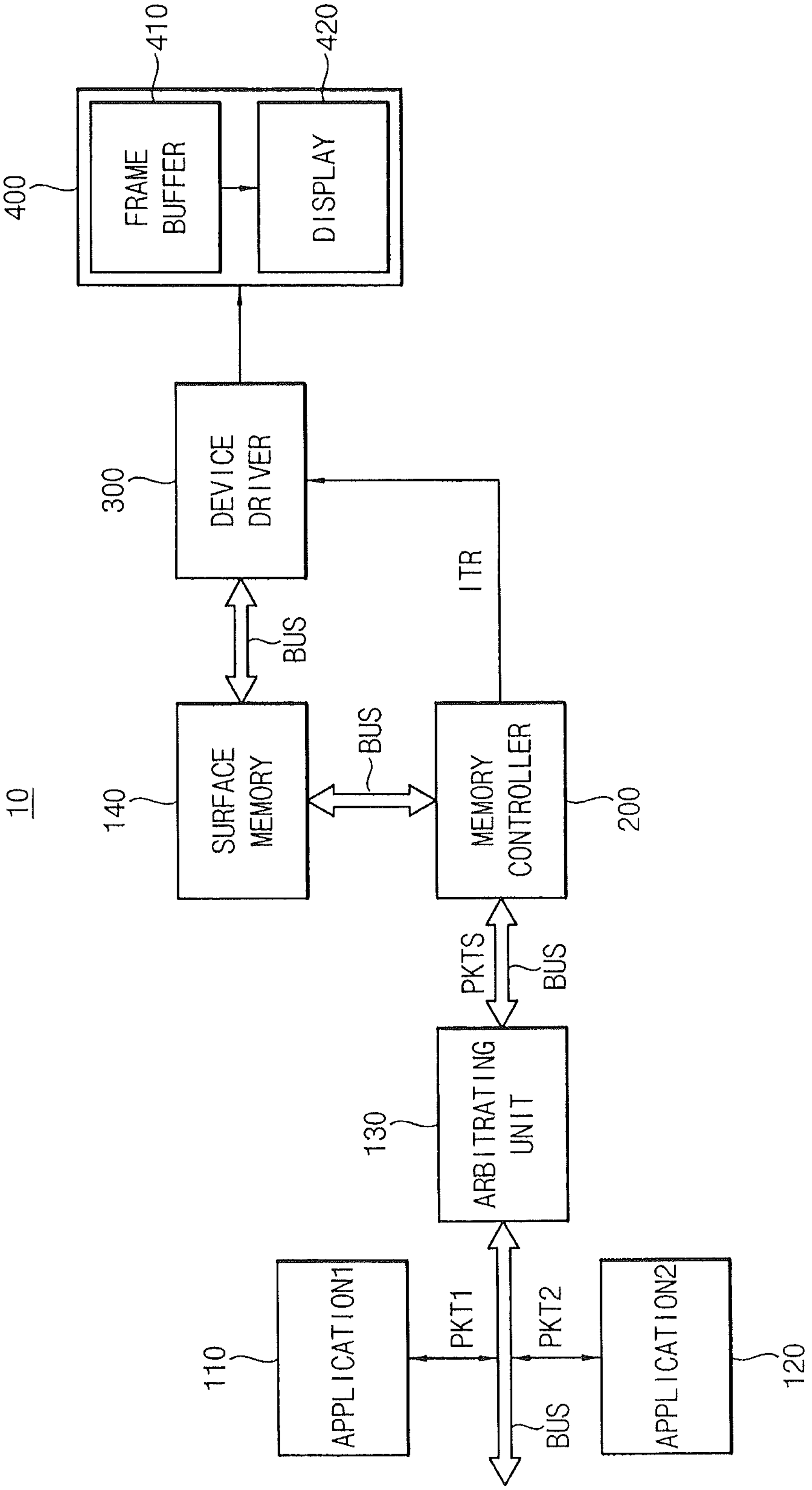
FIG. 1 is a block diagram illustrating an image display system according to some example embodiments.

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating an image display system according to some example embodiments. Referring to FIG. 1, an image display system 10 includes a surface memory 140, a memory controller 200, a device driver 300 and a display module 400. The display module 400 may include a frame buffer 410 and a display panel 420. The image display system 10 may further include a first application 110, a second application 120 and an arbitrating unit 130. The first and second applications 110 and 120 may be implemented externally to the image display system 10 or in the image display system 10. In addition, the first and second applications 110 and 120 may be implemented with software programs. The first application 110 may be a host and the second application 120 may be an input/output device. The arbitrating unit 130 may be implemented externally to the image display system 10 or in the image display system 10. The first and second applications 110 and 120 are connected with the arbitrating unit 130 through a bus BUS, the arbitrating unit 130 is connected with a memory controller 200 through a bus BUS, the memory controller 200 is connected to the surface memory through a bus BUS, and the surface memory 140 is connected with the device driver 300 through a bus BUS.

The first application 110 provides a first packet PKT1 through an application program interface (API, not illustrated), and the second application 120 provides a second packet PKT2 through an API. The arbitrating unit 130 selects one of the first and second applications 110 and 120 according to a round-robin schedule or a priority schedule and provides the selected one as a selected packet PKTS to the memory controller 200. The arbitrating unit 130 selects one of the first and second applications 110 and 120 when the first and second applications 110 and 120 simultaneously access the memory controller 200.

The memory controller 200 may perform an operation(s) according to a type of the selected packet PKTS. For example, when the selected packet PKTS corresponds to a read packet, the memory controller 200 accesses the surface memory 140 based on read address in the selected packet PKTS, reads data corresponding to the read address from the surface memory 140, and provides the read data through the arbitrating unit 130 to the application that provides the selected packet PKTS. For example, when the selected packet PKTS corresponds to a write packet, the memory controller 200 may perform write operation to the surface memory 140 based on write address and write data in the selected packet PKTS. When the controller 200 performs the write operation to the surface memory 140, the memory controller 200 may selectively generate an interrupt signal ITR to provide the interrupt signal ITR to the device driver 300 according to whether the write address in the selected packet is at least partially overlapped with a reference address range. That is, the memory controller 200 may generate the interrupt signal ITR to be provided to the device driver 300 when the write address in the selected packet is at least partially overlapped with the reference address range.

The device driver 300 accesses the surface memory 140, reads and processes data stored in the surface memory 140 and stores the processed data in the frame buffer 410 in the display module 400 when the memory controller 300 provides the interrupt signal ITR to the device driver 300. The data stored in the frame buffer 410 is displayed in the display panel 420 as image data. That is, the image display system 10 according to example embodiments designates a specific region of the surface memory 140, generates the interrupt signal ITR when the write data in the selected packet PKTS are at least partially overlapped with the designated region of the surface memory 140, and notifies the device driver 300 that data in the specific region of the surface memory 140 is updated. When the device driver 300 receives the interrupt signal ITR, the device driver 300 accesses the surface memory 140 and reads and processes the data stored in the surface memory 140. That is, the device driver 300 accesses the surface memory 140, reads and processes the data stored in the surface memory 140 and provides the processed data to the frame buffer 410 when the data included in the specific region of the surface memory 140 is updated. The surface memory 140 may include volatile memories such as SDRAMs. The surface memory 140 may have a configuration substantially similar with a configuration of the frame buffer 410.

Figure 2:
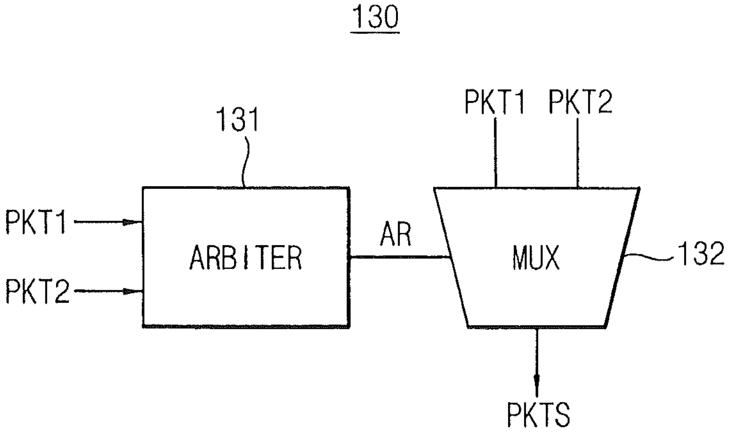
FIG. 2 is a block diagram illustrating an example of the arbitrating unit in FIG. 1 according to some example embodiments.

FIG. 2 is a block diagram illustrating an example of the arbitrating unit in FIG. 1 according to some example embodiments. Referring to FIG. 2, an arbitrating unit 130 includes an arbiter 131 and a routing unit 132. The arbiter 131 receives the first and second packets PKT1 and PKT2, and generates an arbitration signal AR based on the received first and second packets PKT1 and PKT2. The routing unit 132 selects one of the first and second packets PKT1 and PKT2 to provide the selected packet PKTS in response to the arbitration signal AR.

The arbiter 131 receives the first and second packets PKT1 and PKT2 and may generate the arbitration signal AR based on a round-robin schedule. The arbiter 131 may generate the arbitration signal AR such that the received first and second packets PKT1 and PKT2 are selected in order according to the round-robin schedule. The arbiter 131 may generate the arbitration signal AR such that the received first and second packets PKT1 and PKT2 are selected based on priorities of the first and second packets PKT1 and PKT2 according to the priority schedule when the first and second packets PKT1 and PKT2 have respective priorities. Although it is explained that the arbitrating unit 130 receives the first and second packets PKT1 and PKT2 with reference to FIGS. 1 and 2, the arbitrating unit 130 may receive three or more packets.

Figure 3:
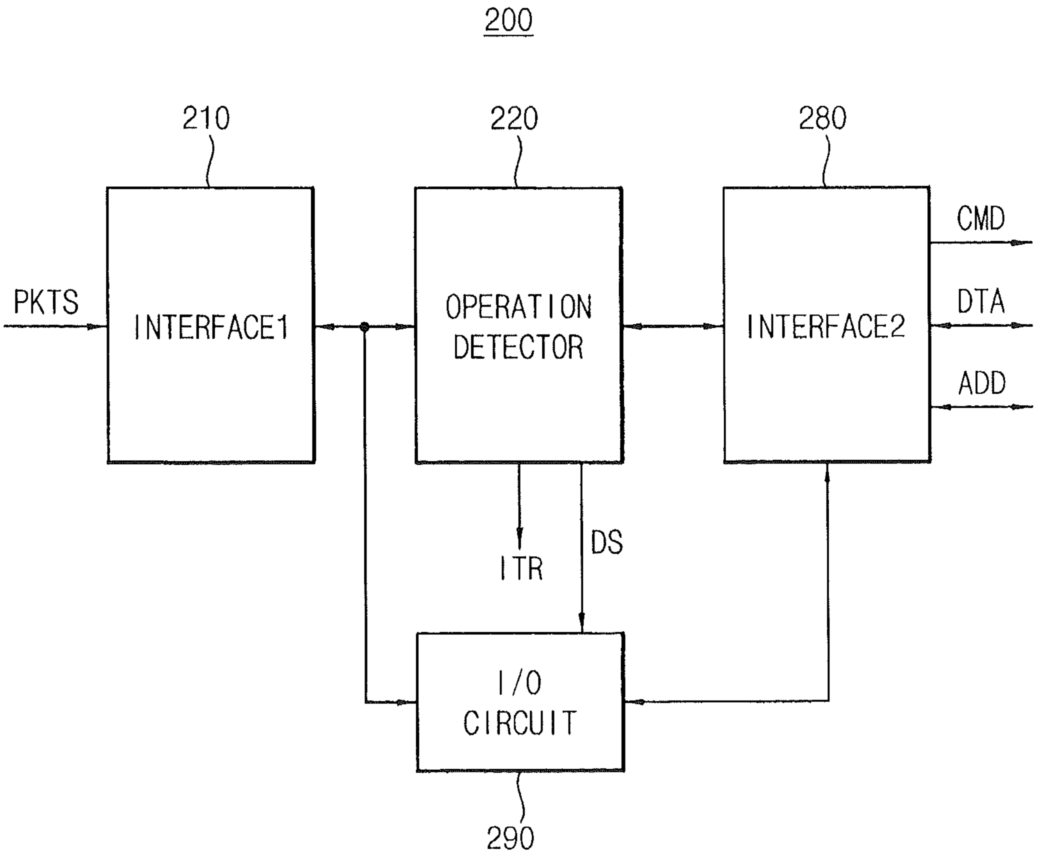
FIG. 3 is a block diagram illustrating an example of the memory controller in FIG. 1 according to some example embodiments.

FIG. 3 is a block diagram illustrating an example of the memory controller in FIG. 1 according to some example embodiments. Referring to FIG. 3, a memory controller 200 includes a first interface unit 210, an operation detector 220, a second interface unit 280 and an input/output (I/O) circuit 290. The first interface unit 210 interfaces the selected packet PKTS from the arbitrating unit 210 to provide the selected packet PKTS to the operation detector 220 and the I/O circuit 290. The first interface unit 210 may conform to an advanced extensible interface (AXI) protocol.

The operation detector 220 generates a decision signal DS indicating a type of the selected packet PKTS, based on the type of the selected packet PKTS and an address of the selected packet PKTS and provides the decision signal DS to the I/O circuit 290. In addition, the operation detector 220 may selectively generate the interrupt signal ITR based on the type and address of the selected packet PKTS. The I/O circuit 290 may adjust a timing of providing the selected packet PKTS to the second interface unit 280, in response to the decision signal DS. That is, the I/O circuit 290 may adjust the timing of providing the selected packet PKTS to the second interface unit 280, in response to the decision signal DS which may be varied according to the type and address of the selected packet PKTS. Functions of the I/O circuit 290 may be integrated into the operation detector 220. That is, the operation detector 220 may adjust the timing of providing the selected packet PKTS to the second interface unit 280, in response to the decision signal DS.

The second interface unit 280 may provide the surface memory 140 with command CMD and data DTA included in the selected packet PKTS. For example, when the type of the selected packet PKTS correspond to a write packet, the second interface unit 280 may provide the surface memory 140 with a command CMD, data DTA and an address ADDR included in the selected packet PKTS. For example, when the type of the selected packet PKTS correspond to a read packet, the second interface unit 280 may provide the surface memory 140 with a command CMD and address ADDR, and receives data DTA corresponding to the address ADDR from the surface memory 140. Although it is explained that the memory controller 200 includes the first interface unit 210, the operation detector 220, the second interface unit 280 and the I/O circuit 290 with reference to FIG. 3, the memory controller 200 may include more circuit components (not illustrated) for controlling the surface memory 140.

Figure 4:
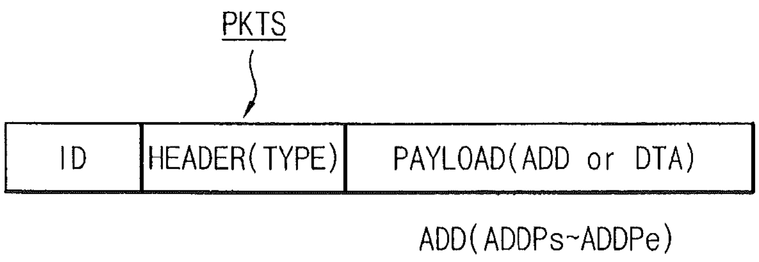
FIG. 4 illustrates a configuration of the packet according to some example embodiments.

FIG. 4 illustrates a configuration of the packet according to some example embodiments. Referring to FIG. 4, the packet (the selected packet PKTS) may include an identification information ID, a header information HEADER and a payload PAYLOAD. The identification information ID may include a sender identification information and a receiver identification information. The header information HEADER may include a type TYPE of the packet and the command CMD, and the payload PAYLOAD may include the address ADD and/or the data DTA. The type TYPE of the packet denotes one of a write packet and a read packet. When the type TYPE of the packet denotes the write packet, the payload PAYLOAD may include write address and write data. The address ADD may include a starting address ADDPs and an ending address ADDPe. When the type TYPE of the packet denotes the read packet, the payload PAYLOAD may include read address. When the type TYPE of the packet is represented with three bits, "010" may denote the read packet and "011" may denote the write packet. In addition, the packet PKTS may be one of a write request packet, a read request packet, a response packet, a write packet and a read packet.

Figure 5:
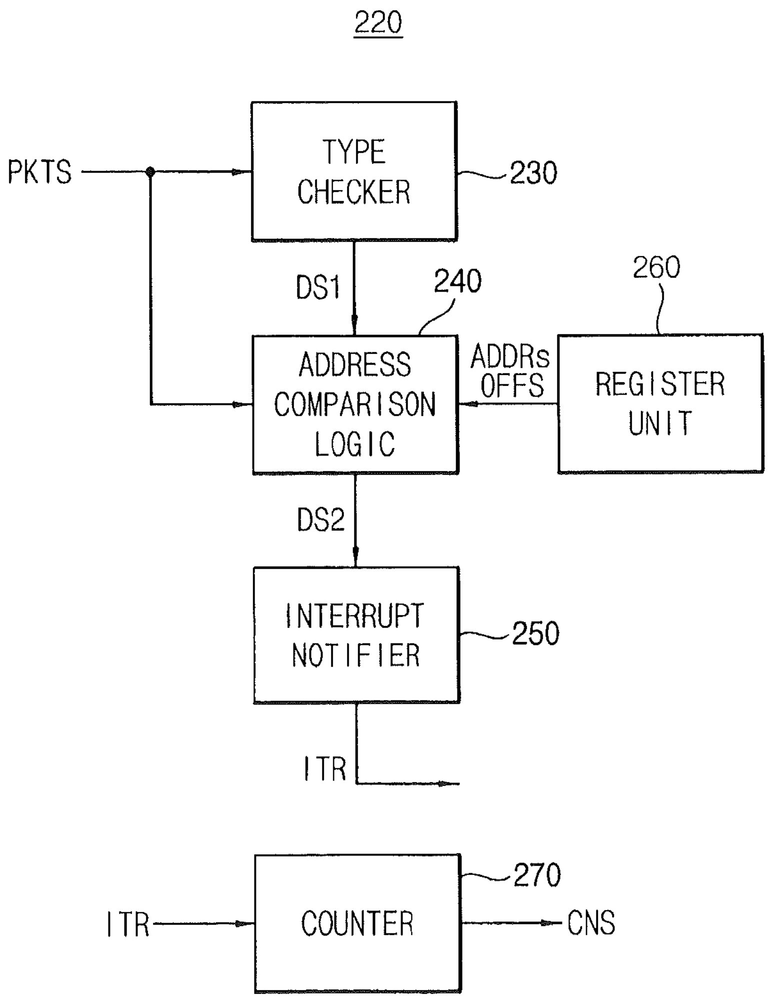
FIG. 5 is a block diagram illustrating an example of the operation detector in FIG. 3 according to some example embodiments.

FIG. 5 is a block diagram illustrating an example of the operation detector in FIG. 3 according to some example embodiments. Referring to FIG. 5, an operation detector 200 may include a packet type checker 230, an address comparison logic 240, an interrupt signal generator 250 (represented as 'interrupt notifier'), a register unit 260 and a counter 270.

The packet type checker 230 checks the type TYPE in the header information HEADER in the selected packet PKTS to provide a first decision signal DS1 indicating the type TYPE of the selected packets PKTS. When the selected packets PKTS is a write packet, the first decision signal DS1 may have a first logic level (logic high level). When the selected packets PKTS is a read packet, the first decision signal DS1 may have a second logic level (logic low level).

The address comparison logic 240 may be selectively enabled according to logic level of the first decision signal DS1, may determine whether the address in the selected packet PKTS is at least partially overlapped with the reference address range, and may provide the interrupt signal generator 250 with a second decision signal DS2 indicating whether the address in the selected packet PKTS is at least partially overlapped with the reference address range. For example, when the selected packets PKTS is a read packet and the first decision signal DS1 has a second logic level, the address comparison logic 240 may not be enabled in response to the first decision signal DS1. However, when the selected packets PKTS is a write packet and the first decision signal DS1 has a first logic level, the address comparison logic 240 may be enabled in response to the first decision signal DS1. When the address comparison logic 240 is enabled in response to the first decision signal DS1, the address comparison logic 240 may determine whether the address in the selected packet PKTS is at least partially overlapped with the reference address range, and may provide the interrupt signal generator 250 with the second decision signal DS2 indicating whether the address in the selected packet PKTS is at least partially overlapped with the reference address range. For example, when the address in the selected packet PKTS is at least partially overlapped with the reference address range, the second decision signal DS2 may have a first logic level (logic high level). Alternatively, when the address in the selected packet PKTS is not overlapped with the reference address range, the second decision signal DS2 may have a second logic level (logic low level).

The interrupt signal generator 250 may be selectively enabled according to logic level of the second decision signal DS2, and may generate the interrupt signal ITR. For example, when the address in the selected packet PKTS is at least partially overlapped with the reference address range and the second decision signal DS2 has a first logic level, the interrupt signal generator 250 is enabled in response to the second decision signal DS2 to generate the interrupt signal ITR to the device driver 300. But, when the address in the selected packet PKTS is not overlapped with the reference address range and the second decision signal DS2 may have a second logic level, the interrupt signal generator 250 may not be enabled.

The register unit 260 may store a staring address ADDRs of the reference address range and an offset OFFS corresponding to a size of the reference address range. The address comparison logic 240 may compare the starting address ADDRs and an ending address of the reference address range with an starting address and an ending address of the selected packet PKTS by referring to the staring address ADDRs of the reference address range and the offset OFFS of the reference address range to determine a logic level of the second decision signal DS2. The counter 270 counts the interrupt signal ITR to provide a counting signal CNS. The counter 270 provides the counting signal CNS to an external host or the first and second applications 110 and 120. The external host or the first and second applications 110 and 120 may compare the counting signal CNS with a reference value and controls the register unit 260 such that the reference address range is adjusted when the counting signal CNS is below than the reference value during a predetermined interval. When the number of data write operation to the reference address range is below the reference value during the predetermined interval, the reference address range is required to be adjusted. The external host or the first and second applications 110 and 120 is notified of the number of data write operation (data updating operation) to the reference address range through the counting signal CNS.

The packet type checker 230 may provide the first decision signal DS1 to the I/O circuit 290 in FIG. 3. The I/O circuit 290 may adjust a timing of providing the selected packet PKTS to the second interface unit 280 according to a logic level of the first decision signal DS1. For example, when the first decision signal DS1 has a first logic level, the selected packet PKTS is a write packet. The I/O circuit 290 may delays a timing of providing the selected packet PKTS to the second interface unit 280 until the address comparison logic 240 determines whether the address in the selected packet PKTS is at least partially overlapped with the reference address range. For example, when the first decision signal DS1 has a second logic level, the selected packet PKTS is a read packet. The I/O circuit 290 may immediately provide the selected packet PKTS from the first interface unit 210 to the second interface unit 280. The I/O circuit 290 may include delay elements for adjusting a timing of providing the selected packet PKTS to the second interface unit 280.

Figure 6:
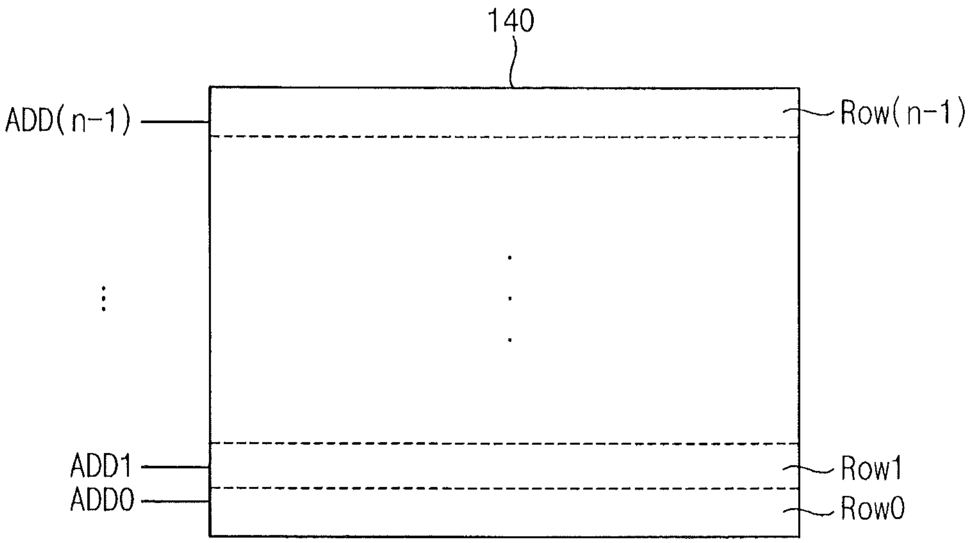
FIG. 6 illustrates a surface memory in FIG. 1 according to some example embodiments.

FIG. 6 illustrates a surface memory in FIG. 1 according to some example embodiments. Referring to FIG. 6, the surface memory 140 includes a plurality of rows ROW0~ROW(n−1), each including a plurality of memory cells. Each of the plurality of rows ROW0~ROW(n−1) may correspond to each of a plurality of addresses ADD0~ADD(n−1). Each of the memory cells may store data which will be provided to the device driver 300. In addition, referring to FIG. 1, each of the plurality of rows ROW0~ROW(n−1) of the surface memory 140 may correspond to each of rows of the frame buffer 410. Each row of the frame buffer 410 may include a plurality of memory cells, each storing image data to be displayed in the display panel 420. Therefore, each row of the surface memory 140 or the frame buffer 410 may correspond to each data line of the image data, and the frame buffer 410 may have capacity corresponding to a size of the display panel 420. For example, when the display panel 420 supports 320*240 pixels, the frame buffer 410 can include 240 rows and each of 240 rows can include 320 memory cells corresponding to 320 pixels. Accordingly, the surface memory 140 includes least 240 rows, and provides the device driver 300 with (image) data to be provided to the frame buffer 410.

Figure 7:
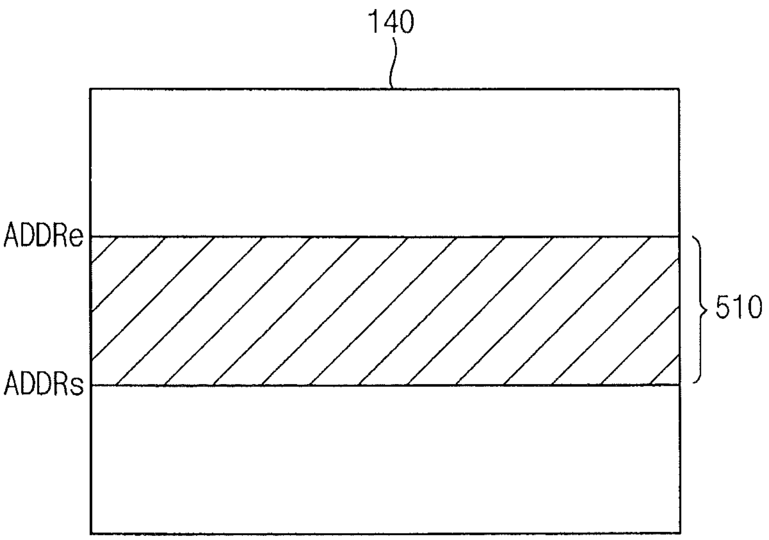
FIG. 7 illustrates the reference address range according to some example embodiments.
Figure 8A:
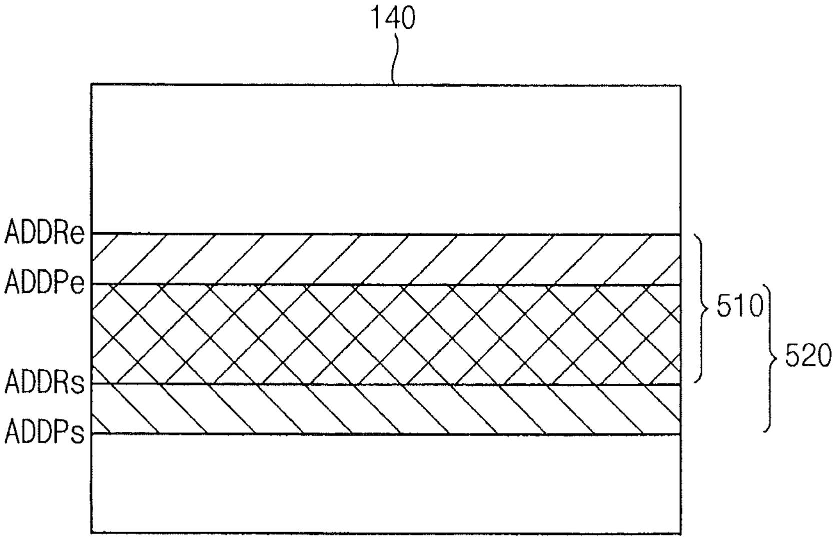
FIGS. 8A through 8D illustrate respectively the reference address range and an address range in the selected packet according to some example embodiments.
Figure 8B:
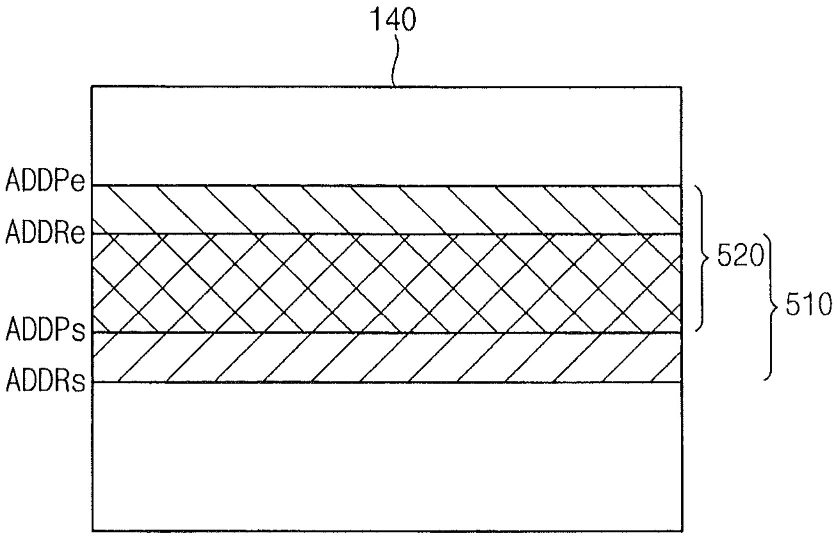
Figure 8C:
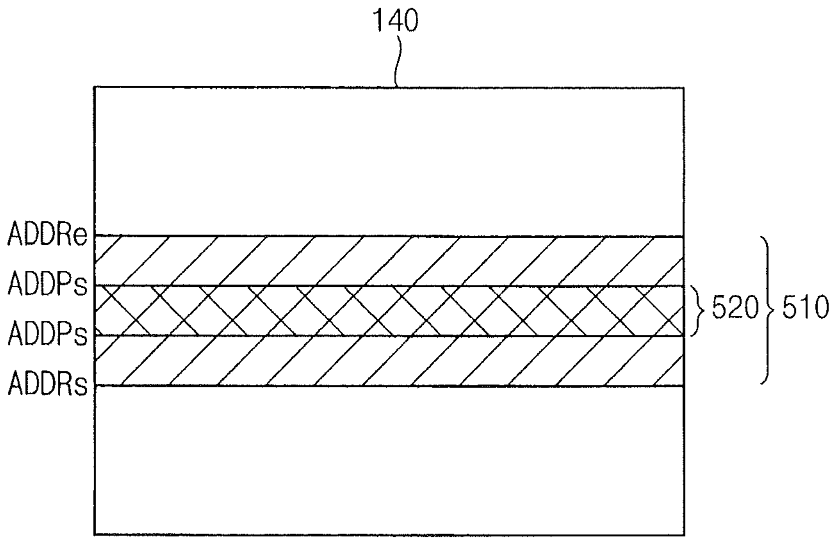
Figure 8D:
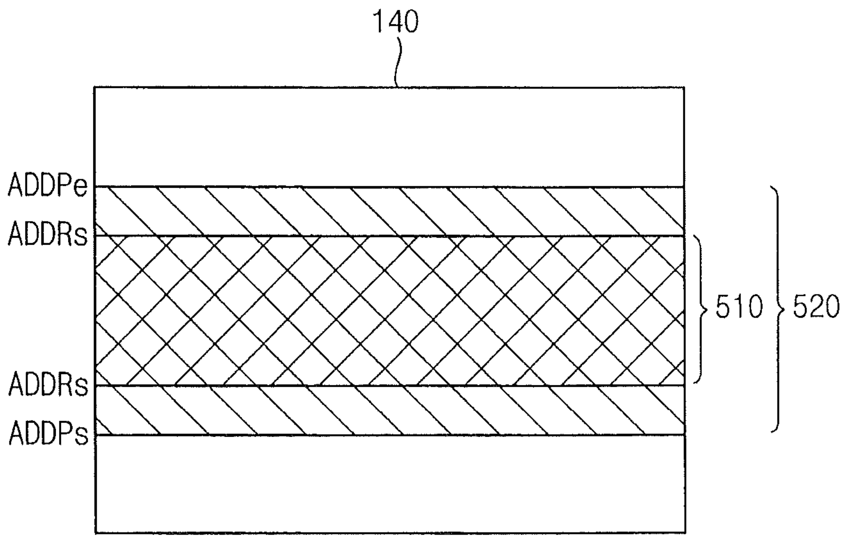

FIG. 7 illustrates the reference address range according to some example embodiments. Referring to FIG. 7, the reference address range 510 may be defined by the starting address ADDRs and the ending address ADDRe by referring to the starting address ADDRs and the offset OFFS stored in the register unit 260 in FIG. 5. The ending address ADDRe may be obtained by performing binary arithmetic operation on the starting address ADDRs and the offset OFFS.

FIGS. 8A through 8D illustrate respectively the reference address range and an address range in the selected packet according to some example embodiments. FIGS. 8A through 8D illustrate various cases that a write address range 520 in the selected packet PKTS is at least partially overlapped with the reference address range 510 when the selected packet PKTS is a write packet. Referring to FIGS. 8A through 8D, it is noted that the write address range 520 defined by a starting address ADDPs and an ending address ADDPe is at least partially overlapped with the reference address range 510 defined by the starting address ADDRs and the ending address ADDRe. When the write address range 520 is at least partially overlapped with the reference address range 510 as illustrated in FIGS. 8A through 8D, the second decision signal DS has a first logic level, and thus, the interrupt signal generator 250 generates the interrupt signal ITR.

Figure 9A:
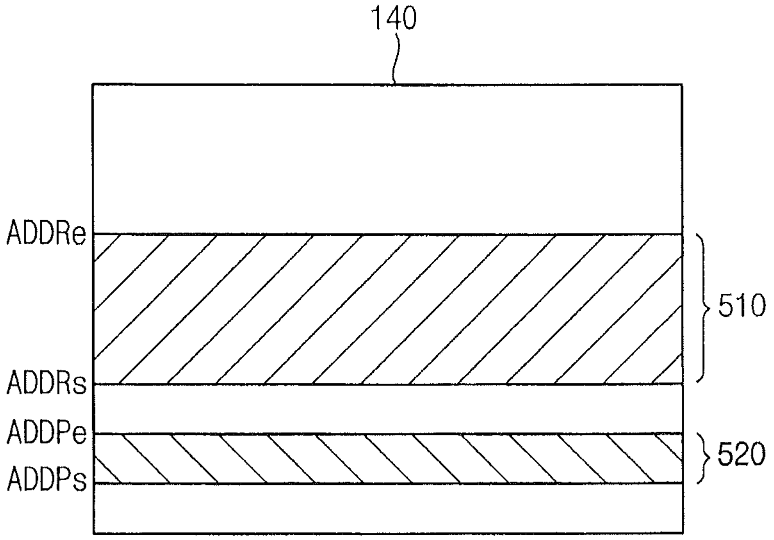
FIGS. 9A and 9B illustrate respectively the reference address range and the address range in the selected packet according to some example embodiments.
Figure 9B:
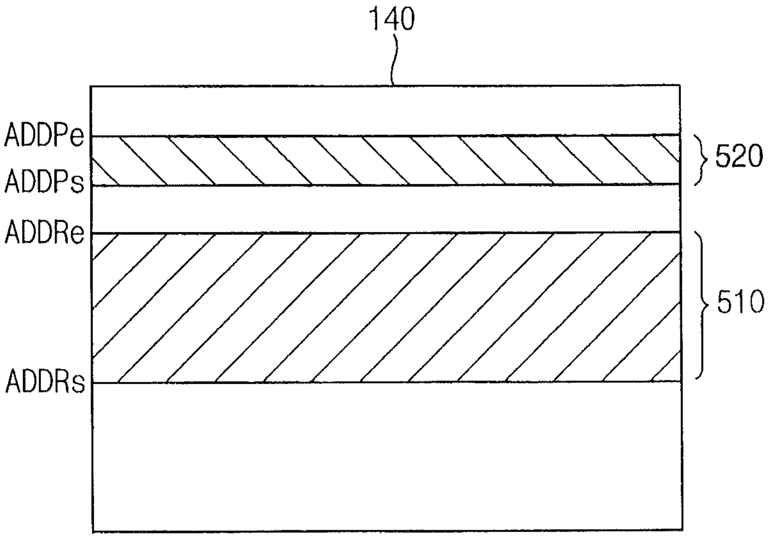

FIGS. 9A and 9B illustrate respectively the reference address range and the address range in the selected packet according to some example embodiments. FIGS. 9A and 9B illustrate cases that a write address range 520 in the selected packet PKTS is not overlapped with the reference address range 510 when the selected packet PKTS is a write packet. Referring to FIGS. 9A and 9B it is noted that the write address range 520 defined by the starting address ADDPs and the ending address ADDPe is not overlapped with the reference address range 510 defined by the starting address ADDRs and the ending address ADDRe. When the write address range 520 is not overlapped with the reference address range 510 as illustrated in FIGS. 9A and 9B, the second decision signal DS has a second logic level, and thus, the interrupt signal generator 250 does not generate the interrupt signal ITR.

Figure 10:
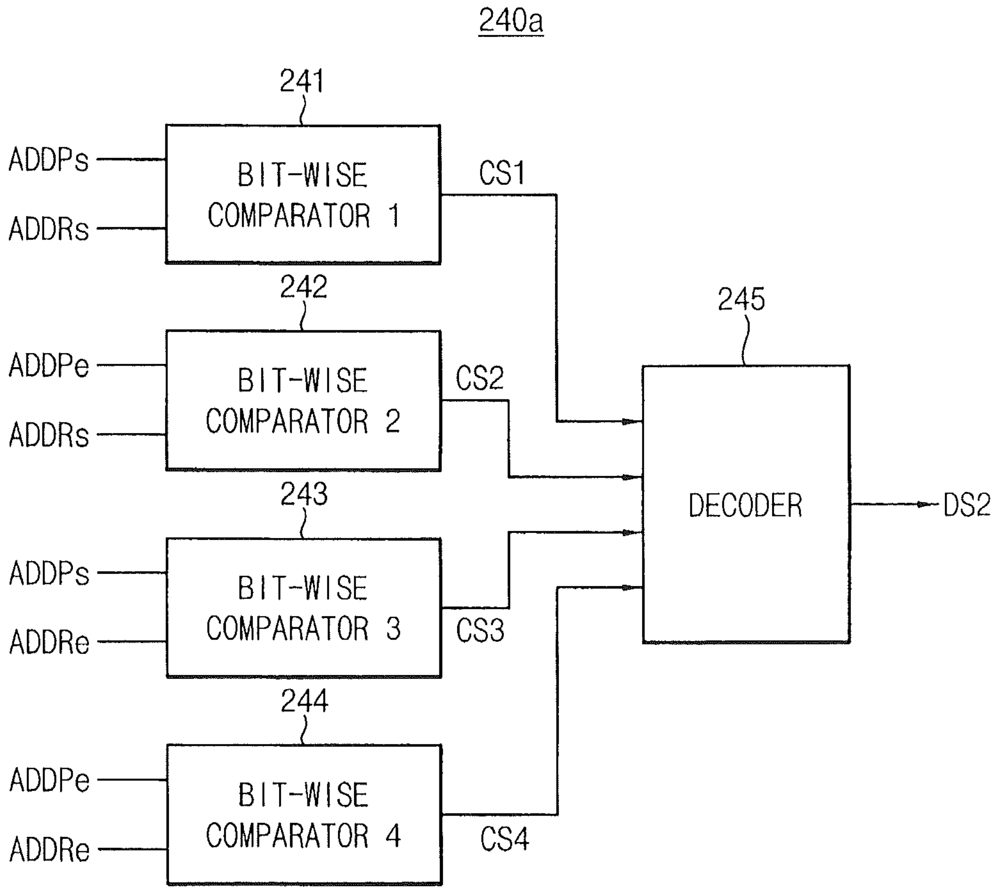
FIG. 10 is a block diagram illustrating an example of the address comparison logic in FIG. 5 according to some example embodiments.

FIG. 10 is a block diagram illustrating an example of the address comparison logic in FIG. 5 according to some example embodiments. Referring to FIG. 10, an address comparison logic 240*a* may include bit-wise comparators 241~244 and a decoder 245. The bit-wise comparator 241 compares the starting address ADDRs of the reference address range with the starting address ADDPs of the selected packet PKTS to output a first comparison signal CS1 indicating comparison result of the starting address ADDRs of the reference address range with the starting address ADDPs of the selected packet PKTS. The bit-wise comparator 242 compares the starting address ADDRs of the reference address range with the ending address ADDPe of the selected packet PKTS to output a second comparison signal CS2 indicating comparison result of the starting address ADDRs of the reference address range with the ending address ADDPe of the selected packet PKTS. The bit-wise comparator 243 compares the ending address ADDRe of the reference address range with the starting address ADDPs of the selected packet PKTS to output a third comparison signal CS3 indicating comparison result of the ending address ADDRe of the reference address range with the starting address ADDPs of the selected packet PKTS. The bit-wise comparator 244 compares the ending address ADDRe of the reference address range with the ending address ADDPe of the selected packet PKTS to output a fourth comparison signal CS4 indicating comparison result of the ending address ADDRe of the reference address range with the ending address ADDPe of the selected packet PKTS. The decoder 245 decodes the first through fourth comparison signals CS1~CS4 to output the second decision signal DS2 indicating decoding result.

For example, when the write address range 520 and the reference address range 510 is in a situation as illustrated in FIG. 9A, the bit-wise comparator 244 outputs the fourth comparison signal CS4 having a second logic level (logic low level). When the bit-wise comparator 244 outputs the fourth comparison signal CS4 having a second logic level, the decoder 245 may output the second decision signal DS2 having a second logic level without regard to logic levels of the first through third comparison signals CS1~CS3.

However, when the write address range 520 and the reference address range 510 is in a situation as illustrated in FIG. 9B, the bit-wise comparator 243 outputs the third comparison signal CS3 having a first logic level (logic high level). When the bit-wise comparator 243 outputs the third comparison signal CS3 having a first logic level, the decoder 245 may output the second decision signal DS2 having a second logic level without regard to logic levels of the first, second and fourth comparison signals CS1, CS2 and CS4.

In addition, when the write address range 520 and the reference address range 510 is in a situation as illustrated in one of FIGS. 8A through 8D, the decoder 243 may output the second decision signal DS2 having a first logic level (logic high level).

Figure 11:
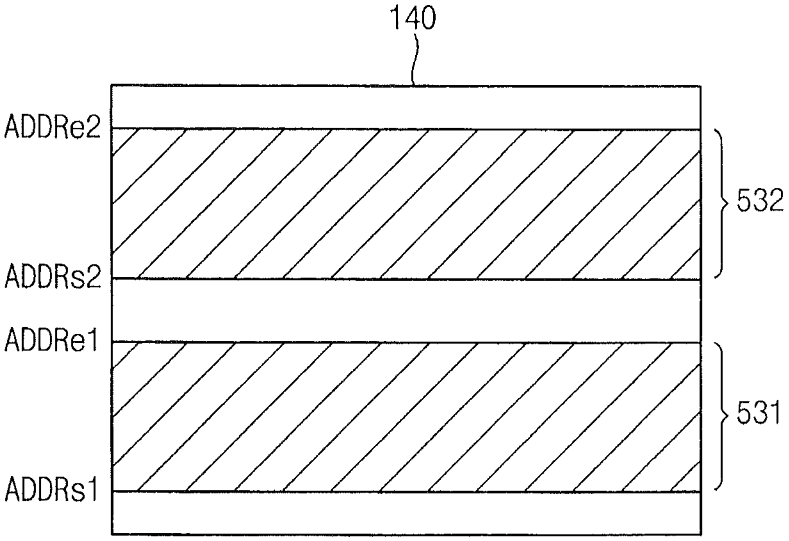
FIG. 11 illustrates that the reference address range include a plurality sub address ranges according to some example embodiments.

FIG. 11 illustrates that the reference address range include a plurality sub address ranges according to some example embodiments. Referring to FIG. 11, the surface memory 140 may include a plurality sub reference address ranges 531 and 532. The sub reference address range 531 may be defined by a first starting address ADDRs1 and a first ending address ADDRe1. The sub reference address range 532 may be defined by a second starting address ADDRs2 and a second ending address ADDRe2. The sub reference address ranges 531 and 532 may be set by referring to the register unit 260 in FIG. 5. The register unit 260 may store the first starting address ADDRs1 and a first offset OFFS1 corresponding to a size of the sub reference address range 531 and the second starting address ADDRs2 and a second offset OFFS2 corresponding to a size of the sub reference address range 532.

When the surface memory 140 includes the plurality sub reference address ranges 531 and 532, the address comparison logic 240 may output the second decision signal DS2 which has a first logic level, when the selected packet PKTS is a write packet and the address range of the selected packet PKTS is at least partially overlapped with at least one of the plurality sub reference address ranges 531 and 532. That is, when surface memory 140 includes the plurality sub reference address ranges 531 and 532, the operation detector 220 generates the interrupt signal ITR when the address range of the selected packet PKTS is at least partially overlapped with at least one of the plurality sub reference address ranges 531 and 532 and the device driver 300 reads and processes the data stored in the surface memory 140 to store the processed data in the frame buffer 140.

Figure 12:
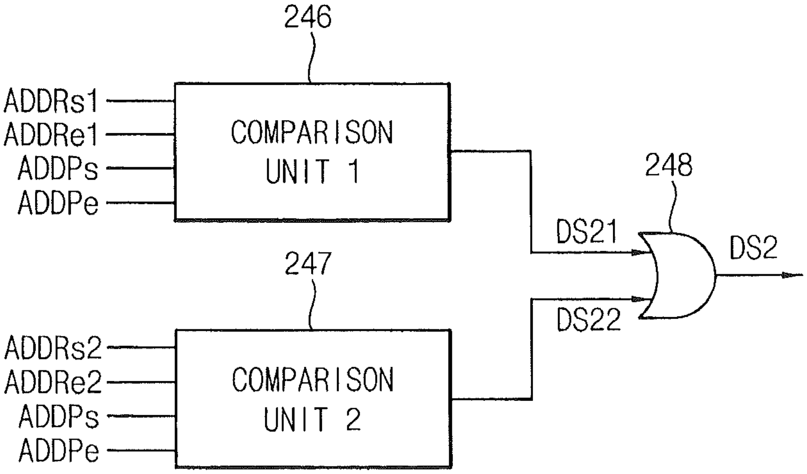
FIG. 12 is a block diagram illustrating an example of the address comparison logic in FIG. 5 according to other example embodiments.

FIG. 12 is a block diagram illustrating an example of the address comparison logic in FIG. 5 according to other example embodiments. FIG. 12 illustrates an example of the address comparison logic in FIG. 5 when the surface memory 140 includes the plurality sub reference address ranges 531 and 532 as illustrated in FIG. 12. Referring to FIG. 12, an address comparison logic 240*b* may include a first comparison unit 246, a second comparison unit 271 and an OR gate 248. The first comparison unit 246 compares the first starting address ADDRs1 and the first ending address ADDRe1 of the sub reference address range 531 with the starting address ADDPs and the ending address ADDPe of the selected packet PKTS to output a first intermediate decision signal DS21 indicating whether the address range of the selected packet PKTS is at least partially overlapped with the sub reference address range 531. The second comparison unit 247 compares the second starting address ADDRs2 and the second ending address ADDRe2 of the sub reference address range 532 with the starting address ADDPs and the ending address ADDPe of the selected packet PKTS to output a second intermediate decision signal DS22 indicating whether the address range of the selected packet PKTS is at least partially overlapped with the sub reference address range 532. The OR gate 248 performs an OR operation on the first and second intermediate decision signals DS21 and DS22 to output the second decision signal DS2. Therefore, the OR gate 248 outputs the second decision signal DS2 having a first logic level when at least one of the first and second intermediate decision signals DS21 and DS22 has a first logic level.

That is, the address comparison logic 240*b* may provide the second decision signal DS2 having a first logic level when the address range of the selected packet PKTS is at least partially overlapped with at least one of the sub reference address ranges 531 and 532. Each configuration of the first and second comparison unit 246 and 247 may have substantially the same configuration as the address comparison logic 240*a* of FIG. 10. That is, each of the first and second comparison unit 246 and 247 may include the bit-wise comparators 241~244 and the decoder 245. Operations of the first and second comparison unit 246 and 247 are substantially similar with operation of the address comparison logic 240*a* of FIG. 10.

Figure 13:
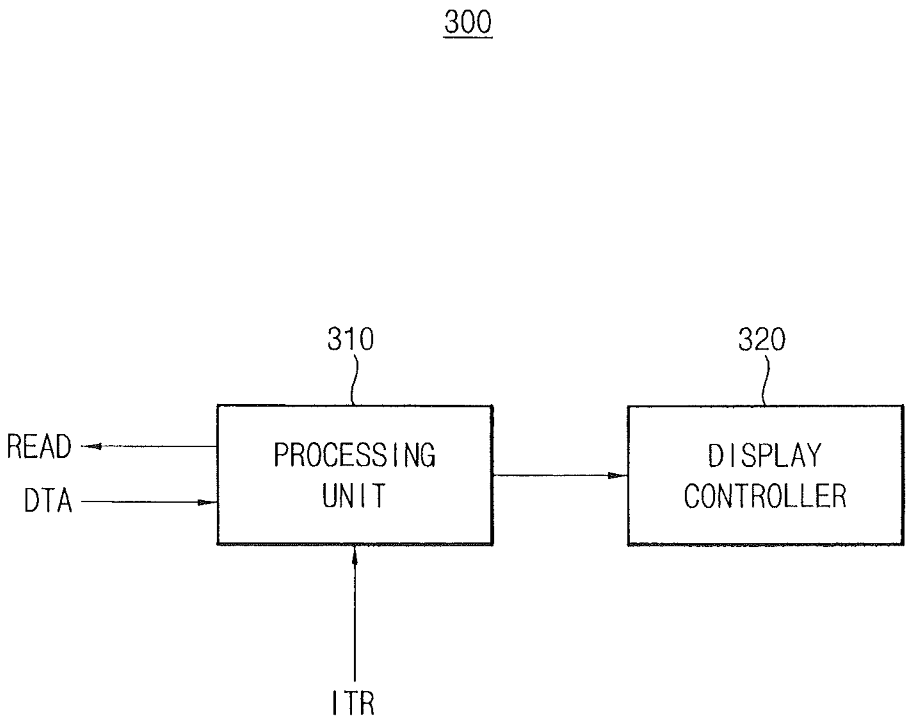
FIG. 13 is a block diagram illustrating an example of the device driver according to some example embodiments.

FIG. 13 is a block diagram illustrating an example of the device driver according to some example embodiments. Referring to FIG. 13, the device driver 300 may include a processing unit 310 and a display controller 320. The processing unit 310 transmits a read request READ to the surface memory 140 in response to the interrupt signal ITR, receives from the surface memory 140 a frame which includes data corresponding to the reference address range, processes the frame and provides the processed frame to the display controller 320. The display controller 310 provides the processed data to the frame buffer 410. The processing unit 310 may include a bus interface unit, a fetching unit, a command processor, a register, a synchronizing unit, a flipping and rotating unit and a color conversion and scaling unit.

The bus interface unit exchanges data between the surface memory 140 and the display controller 320. The fetching unit may generate addresses to the bus interface unit for data reading. The command processor receives commands in a packet, and directs various operations of the units of the processing unit 310. The register may store parameters with respect to various processings in the processing unit 310, and monitors and controls the display controller 320. The synchronizing unit tracks write pointers and read pointers with respect to the surface memory 140, and determines whether writing new image data in the frame buffer 410 without arising tearing the display panel 420. The flipping and rotating unit performs flipping and/or rotating operation in the image data received from the frame buffer 410, provides output data to the frame buffer 410. The color conversion and scaling unit receives the data from the surface memory 140 and convert data with input data format to data with output data format if necessary. The input data format, for example, may be luminance and chromaticity (YCbCr format) and the output data format, for example, may be red, green and blue (RGB format). In addition, the color conversion and scaling unit may scale the image in size before storing the image. The display controller 320 stores data processed by the processing unit 310 in the frame buffer 410 by a line (or a row). The data stored in the frame buffer 410 is displayed in the display panel 420 by a frame.

Hereinafter, there will be description on operation of the image display system 10 with reference to FIGS. 1 through 13. The arbitrating unit 130 provides one of the first and second packets PKT1 and PKT2 to the memory controller 200 according to an arbitration schedule. The operation detector 220 in the memory controller 200 performs an operation according to the type of the selected packet PKTS. For example, when the selected packets PKTS is a read packet, the first decision signal DS1 has a second logic level. Therefore, the interrupt signal ITR is not generated, and the memory controller 200 performs a read operation on the surface memory 140, receives read data from the surface memory 140 and transmits the read data to an application which transmits the read request.

When the selected packets PKTS is a write packet, the first decision signal DS1 has a first logic level. Therefore, the address comparison logic 240 is enabled and determines whether the address in the selected packet PKTS is at least partially overlapped with the reference address range and provides the interrupt signal generator 250 with the second decision signal DS2 indicating whether the address in the selected packet PKTS is at least partially overlapped with the reference address range. For example, when the write address range in the selected packet PKTS is not overlapped with the reference address range as illustrated in FIGS. 9A and 9B, the second decision signal DS2 has a second logic level. When the second decision signal DS2 has a second logic level, the interrupt signal ITR is not generated, and write data is written (updated) in areas of the surface memory 140, which is designated by the write address. In this case, the device driver 300 does not access the surface memory 140, because the interrupt signal ITR is not enabled (generated) while image data are written in the surface memory 140.

Alternatively, when the write address range in the selected packet PKTS is at least partially overlapped with the reference address range as illustrated in FIGS. 8A through 8D, the second decision signal DS2 has a first logic level. When the second decision signal DS2 has a first logic level, the interrupt signal ITR is generated, and write data is written (updated) in areas of the surface memory 140, which is designated by the write address. In this case, the device driver 300 does access the surface memory 140, processes the data in the surface memory 140 and stores the processed data in the frame buffer 410 via the display controller 320, because the interrupt signal ITR is generated to the device driver 300.

According to some example embodiments, the reference address range of the surface memory 140 corresponding to data lines of the display panel 420 is predetermined. When image data with respect to the reference address range is updated, the device driver 300 is triggered by the interrupt signal ITR, and the image data with respect to the reference address range is processed and displayed in the display panel 420. Therefore, workload of the bus between the surface memory 140 and the device driver 300 may be reduced, software and/or hardware resources may be efficiently used, and power consumption may be reduced. When image data corresponding to memory area other than the reference address range is updated, the image data corresponding to memory area other than the reference address range is written in the surface memory 140 while the processing the data by the device driver 300 may be delayed until the image data with respect to the reference address range is updated. The reference address range may designate memory region corresponding to a hot region of the display panel, where the image data is more frequently changed than a cold region where the image data is less frequently changed.

The reference address range may be adjusted by counting the number of generation of the interrupt signal ITR. When the counting signal CNS is below than the reference value during a predetermined interval, the external host or the first and second applications 110 and 120 may adjust the reference address range in the register unit 260.

Figure 14:
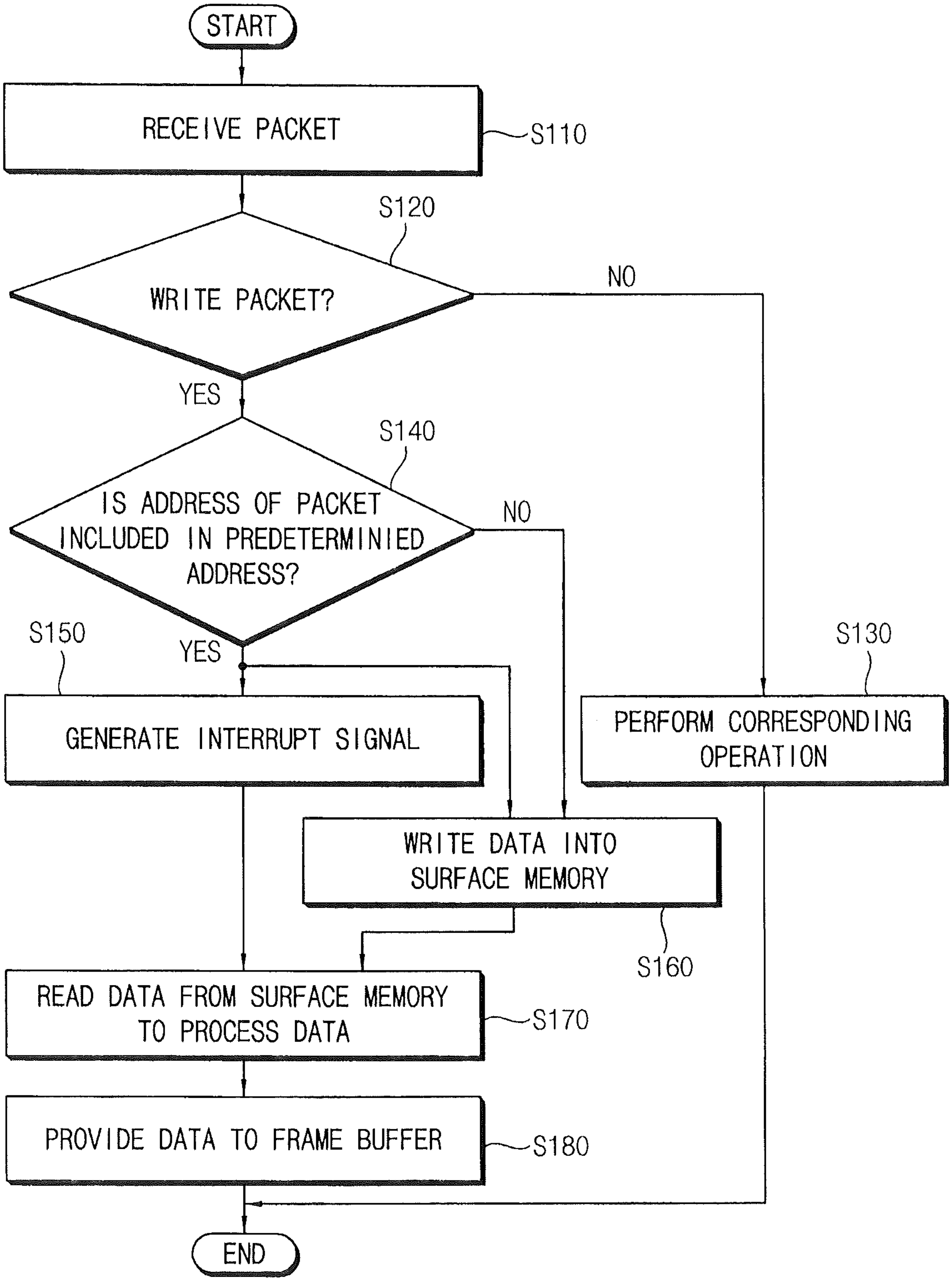
FIG. 14 is a flow chart illustrating a method of processing image data according to some example embodiments.

FIG. 14 is a flow chart illustrating a method of processing image data according to some example embodiments. Hereinafter, there will be description on a method of processing image data with reference to FIGS. 1 through 14. In a method of processing image data, a selected packet PKTS is received in the memory controller 200 (S110). A type of the selected packet PKTS is checked and whether the selected packet PKTS is a write packet or a read packet is determined in the operation detector 200 (S120). When the selected packet PKTS is not a write packet (No in S120), the corresponding operation included in a header of the selected packet PKTS is performed (S130). For example, when the selected packet PKTS is a read packet, the memory controller 200 accesses the surface memory 140, and reads data from the surface memory 140. When the selected packet PKTS is a write packet (Yes in S120), whether the write address range of the selected packet PKTS is at least partially overlapped with the reference address range stored in the register unit 260 is checked by the address comparison logic 240 (S140). When the write address range of the selected packet PKTS is not overlapped with the reference address range 510 (No in S140), the data is written to a memory region of the surface memory, designated by the write address (S160). When the write address range of the selected packet PKTS is at least partially overlapped with the reference address range 510 (Yes in S140), the interrupt signal ITR is generated in the operation detector 220 (S150) and the data is written to the memory region of the surface memory (S160). The data written in the surface memory 140 is read and processed in the device driver 300 in response to the interrupt signal ITR (S170). The processed data is provided to the frame buffer 410 and displayed in the display panel 420 (S180).

According to some example embodiments, when image data with respect to the reference address range is updated, the image data is processed and displayed in the display panel 420. Therefore, workload of the bus between the surface memory 140 and the device driver 300 may be reduced, software and/or hardware resources may be efficiently used, and power consumption may be reduced. When image data corresponding to memory area other than the reference address range is updated, the image data corresponding to memory area other than the reference address range is written in the surface memory 140 while the processing the data by the device driver 300 may be delayed until the image data with respect to the reference address range is updated.

Figure 15:
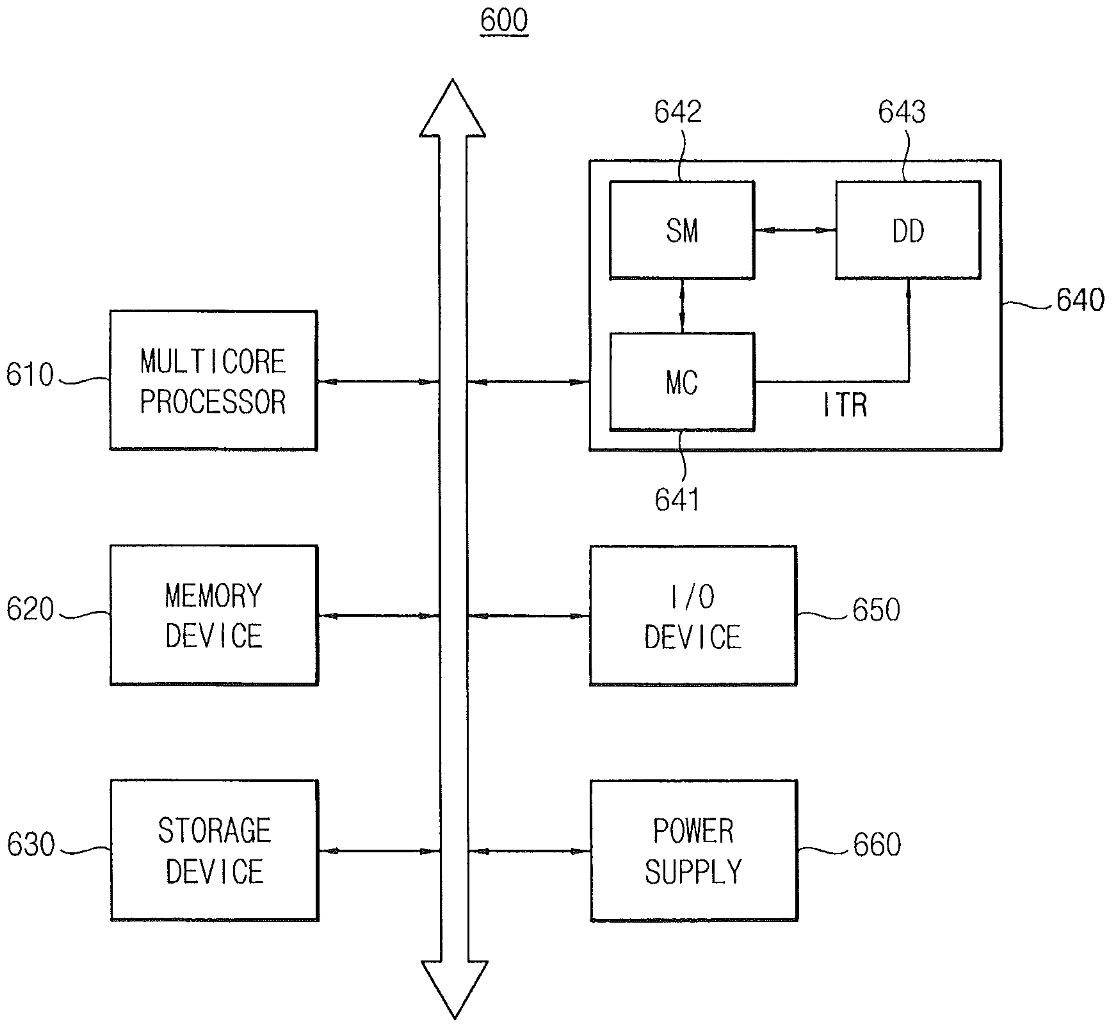
FIG. 15 is a block diagram illustrating an electronic device including an image display system according to some example embodiments.

FIG. 15 is a block diagram illustrating an electronic device including an image display system according to some example embodiments. Referring to FIG. 15, the electronic device 600 may include a multi-core processor 610, a memory device 620, a storage device 630, an input/output device 650, a power supply 660, and an image display system 640. The image display system 640 includes a memory controller 641, a surface memory 642 and a device driver 643. The image display system 640 may further include the arbitrating unit 130 and the display module 400 in FIG. 1. The memory controller 641 selects one of requests (or packets) from masters such as the multi-core processor 610 and the input/output device 650 and processes the selected packet. The memory controller 641 generates the interrupt signal ITR and triggers the device driver 643, the triggered device driver 643 processes the data stored in the surface memory 642 and the display module 400 displays the processed data when the selected packet is a write packet and the write address range is at least partially overlapped with the reference address range of the surface memory 642. Therefore, the workload of the bus and the power consumption may be reduced.

Although not illustrated in FIG. 15, the electronic device 600 includes a plurality of ports for communicating with a video card, a sound card, a memory card, a USB device, other electric devices, etc. The electronic device 600 may be a desktop computer, a laptop computer, a digital camera, a video camcorder, a cellular phone, a smart phone, a portable multimedia player (PMP), a personal digital assistant (PDA), a MP3 player, a navigation device, etc.

The multi-core processor 610 may control the memory device 620, the storage device 630, the input/output device 650 and the image display system 640. The memory device 620 may be coupled to the multi-core processor 610 via a bus (e.g., an address bus, a control bus, a data bus, etc). For example, the memory device 620 may be a dynamic random access memory (DRAM), a static random access memory (SRAM), and/or a non-volatile memory (e.g., an erasable programmable read-only memory (EPROM), an electrically erasable programmable read-only memory (EEPROM), a flash memory device, etc). The storage device 830 may be a hard disk drive (HDD), a compact disk read-only memory (CD-ROM), a solid state drive (SSD), etc. The input/output device 850 may include at least one input device (e.g., a keyboard, a keypad, a touchpad, a mouse, etc) and at least one output device (e.g., a printer, a LCD display, a speaker, etc). The power supply 660 may supply a power voltage for the electronic device 600.

As mentioned above, when image data with respect to the reference address range is updated, the image data is processed and displayed in the display panel. Therefore, workload of the bus may be reduced, software and/or hardware resources may be efficiently used, and power consumption may be reduced. The present inventive concept may be applied to various display devices such as LCD device, OLED display device and LED display device.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An image display system, comprising:

a first memory;

a memory controller configured to generate an interrupt signal in response to a command to write first image data into a first range of addresses within the first memory that at least partially overlaps with a reference range of addresses, said memory controller comprising an address comparison circuit configured to determine whether the first range of addresses at least partially overlaps with the reference range of addresses; and a driver configured read the first image data from the first memory in response to the interrupt signal.

2. The system of claim 1, wherein said memory controller further comprises a register configured to store at least a starting address associated with the reference range of addresses.

3. The system of claim 1, further comprising a display module configured to receive the first image data from said driver.

4. The system of claim 3, wherein said display module comprises a frame buffer configured to store the first image data received from said driver.

5. The system of claim 1, wherein said memory controller is further configured to write second image data into a second range of addresses within the first memory without generation of the interrupt signal when the second range of addresses is outside the reference range of addresses, in response to a command to write second image data into the second range of addresses within the first memory.

6. The system of claim 5, further comprising an arbitration circuit configured to provide said memory controller with a first packet of data comprising the write command, the first image data and at least a starting address associated with the first range of addresses.

7. The system of claim 1, further comprising an arbitration circuit configured to provide said memory controller with a first packet of data comprising the write command, the first image data and at least a starting address associated with the first range of addresses.

8. A method of operating an image display system, comprising:

comparing a first range of memory addresses associated with a first packet of image data against a reference range of addresses to detect at least a partial overlap therebetween concurrently with writing first image data contained within the first packet into a first memory device;

generating an interrupt signal in response to detecting the at least a partial overlap between the first range of memory addresses and the reference range of addresses; and transferring the first image data from the first memory device into a frame buffer within a display module, in response to the interrupt signal.

9. The method of claim 8, wherein said transferring comprises:

reading the first image data from the first memory device into a device driver configured to receive the interrupt signal; and writing the first image data from the device driver into the frame buffer.

10. The method of claim 9, wherein said comparing comprises evaluating a header of the first packet to detect presence of a write command therein.

11. A method of processing image data, the method comprising:

determining a type of a packet provided from at least one application;

selectively determining whether addresses included in the packet are at least partially overlapped with a reference address range; and selectively processing image date included in the packet based on determining whether the addresses included in the packet are at least partially overlapped with the reference address ranges.

12. The method of claim 11, wherein whether the addresses included in the packet are at least partially overlapped with the reference address range is determined when the type of the packet indicates a write packet.

13. The method of claim 12, wherein when addresses corresponding to the image data are at least partially overlapped with the reference address range, the method further comprising:

processing the image data to provide the processed image data to a frame buffer.

14. The method of claim 12, wherein when addresses corresponding to the image data are at least partially overlapped with the reference address ranges, the image data is processed in response to an interrupt signal.

15. The method of claim 11, wherein the reference address range includes a plurality of sub reference address ranges.

16. The method of claim 15, wherein the image data is processed when the addresses corresponding to the image data is at least partially overlapped with at least one of the plurality of sub reference address ranges.

* * * * *